United States Patent
Spaulding et al.

(10) Patent No.: US 9,347,358 B1
(45) Date of Patent: May 24, 2016

(54) SILENCER FOR MID-BED AIR INJECTION MIXING

(71) Applicant: General Electric Company, Schenectady, NY (US)

(72) Inventors: Dennis John Spaulding, Waukesha, WI (US); Maruthi Narasinga Rao Devarakonda, Waukesha, WI (US); James Kristopher von der Ehe, Delafield, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/554,706

(22) Filed: Nov. 26, 2014

(51) Int. Cl.

| | |
|---|---|
| *F01N 1/14* | (2006.01) |
| *F01N 3/28* | (2006.01) |
| *F01N 3/05* | (2006.01) |
| *F01N 3/10* | (2006.01) |
| *F01N 13/00* | (2010.01) |
| *F01N 3/30* | (2006.01) |

(52) U.S. Cl.
 CPC ............... *F01N 3/2885* (2013.01); *F01N 3/05* (2013.01); *F01N 3/101* (2013.01); *F01N 3/106* (2013.01); *F01N 3/30* (2013.01); *F01N 13/007* (2013.01); *F01N 13/009* (2014.06); *F01N 2270/10* (2013.01); *F01N 2570/18* (2013.01); *F01N 2610/06* (2013.01)

(58) Field of Classification Search
 CPC ........... F01N 3/05; F01N 3/101; F01N 3/106; F01N 3/2066; F01N 3/22; F01N 3/30; F01N 13/007; F01N 13/009; F01N 2260/022; F01N 2270/00; F01N 2270/06; F01N 2270/10; F01N 2570/18; F01N 2610/06
 USPC .................... 60/274, 289, 299, 301, 307, 317
 See application file for complete search history.

(56) References Cited

U.S. PATENT DOCUMENTS

| | | | |
|---|---|---|---|
| 5,612,006 A | 3/1997 | Fisk | |
| 5,783,160 A * | 7/1998 | Kinugasa | B01D 53/9409 423/212 |
| 6,345,496 B1 * | 2/2002 | Fuwa | B01D 53/8696 60/274 |
| 8,429,896 B2 | 4/2013 | Pekrul et al. | |
| 2008/0072578 A1 * | 3/2008 | Kumar | B01D 53/945 60/299 |
| 2011/0182791 A1 | 7/2011 | Fedeyko et al. | |
| 2012/0042630 A1 | 2/2012 | Pekrul et al. | |
| 2013/0232955 A1 | 9/2013 | Kohler | |

FOREIGN PATENT DOCUMENTS

EP 2778363 A1 9/2014

OTHER PUBLICATIONS

European Search Report for EP Application No. 15196242 Dated Mar. 31, 2016; 5 pages.

* cited by examiner

*Primary Examiner* — Jorge Leon, Jr.
(74) *Attorney, Agent, or Firm* — Fletcher Yoder, P.C.

(57) ABSTRACT

A system includes an exhaust aftertreatment system configured to treat emissions from a combustion engine. The exhaust aftertreatment system includes a first catalyst assembly having an outlet. The exhaust aftertreatment system also includes an ammonia slip catalyst (ASC) assembly configured to receive a fluid from the first catalyst assembly and to convert ammonia (NH3) within the fluid into nitrogen (N2), wherein the ASC assembly has an inlet. The exhaust aftertreatment system further includes a silencer disposed between the outlet of the first catalyst assembly and the inlet of the ASC assembly, wherein the silencer is configured to receive the fluid and an oxidant for mixing with the fluid provide sufficient oxygen in the fluid flowing into the inlet of the ASC assembly to enable the catalytic activity in the ASC assembly that coverts NH3 into N2, and the silencer is configured to mix the fluid and the oxidant.

20 Claims, 3 Drawing Sheets

SILENCER FOR MID-BED AIR INJECTION MIXING

BACKGROUND

The subject matter disclosed herein relates to an exhaust aftertreatment system for an internal combustion engine, and more specifically, to utilizing a silencer with the aftertreatment system.

Engines (e.g., internal combustion engines such as reciprocating engines or gas turbines) combust a mixture of fuel and air to generate combustions gases that apply a driving force to a component of the engine (e.g., to move a piston or drive a turbine). Subsequently, the combustion gases exit the engine as an exhaust, which may be subject to aftertreatment systems that include one or more catalytic converters (e.g., three-way catalyst (TWC) assembly, ammonia slippage catalyst (ASC) assembly, etc.) to reduce the emissions of nitrogen oxides ($NO_x$), hydrocarbons (HC), and carbon monoxide (CO). However, the footprint (i.e., size and shape) of the aftertreatment system may be incompatible with certain engine sites.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes an exhaust aftertreatment system configured to treat emissions from a combustion engine. The exhaust aftertreatment system includes a first catalyst assembly having an outlet. The exhaust aftertreatment system also includes an ammonia slip catalyst (ASC) assembly configured to receive a fluid from the first catalyst assembly and to convert ammonia ($NH_3$) within the fluid into nitrogen ($N_2$), wherein the ASC assembly has an inlet. The exhaust aftertreatment system further includes a fluid conduit disposed between the first catalyst assembly and the ASC assembly and configured to transfer the fluid from the first catalyst assembly to the ASC assembly. The exhaust aftertreatment system yet further includes an oxidant injection system configured to provide an oxidant for mixing with the fluid to provide sufficient oxygen in the fluid flowing into the inlet of the ASC assembly to enable the catalytic activity in the ASC assembly that converts $NH_3$ into $N_2$. The exhaust aftertreatment system still further includes a silencer disposed along the fluid conduit between the outlet of the first catalyst assembly and the inlet of the ASC assembly, wherein the silencer is configured to receive and to mix both the fluid and the oxidant.

In accordance with a second embodiment, a system includes an exhaust aftertreatment system configured to treat emissions from a combustion engine. The exhaust aftertreatment system includes a first catalyst assembly having an outlet. The exhaust aftertreatment system also includes an ammonia slip catalyst (ASC) assembly configured to receive a fluid from the first catalyst assembly and to convert ammonia ($NH_3$) within the fluid into nitrogen ($N_2$), wherein the ASC assembly has an inlet. The exhaust aftertreatment system further includes a silencer disposed between the outlet of the first catalyst assembly and the inlet of the ASC assembly, wherein the silencer is configured to receive the fluid and an oxidant for mixing with the fluid to provide sufficient oxygen in the fluid flowing into the inlet of the ASC assembly to enable the catalytic activity in the ASC assembly that coverts $NH_3$ into $N_2$, and the silencer is configured to mix the fluid and the oxidant.

In accordance with a third embodiment, a system includes a method for promoting catalytic activity within an ammonia slip catalyst (ASC) assembly in an exhaust aftertreatment system to treat emissions from a combustion engine. The method includes flowing fluid from an outlet of a first catalyst assembly to an inlet of the ASC assembly, injecting an oxidant into the fluid to provide sufficient oxygen in the fluid flowing into the inlet of the ASC assembly, and mixing the fluid and oxidant within a silencer disposed between the first catalyst assembly and the ASC assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
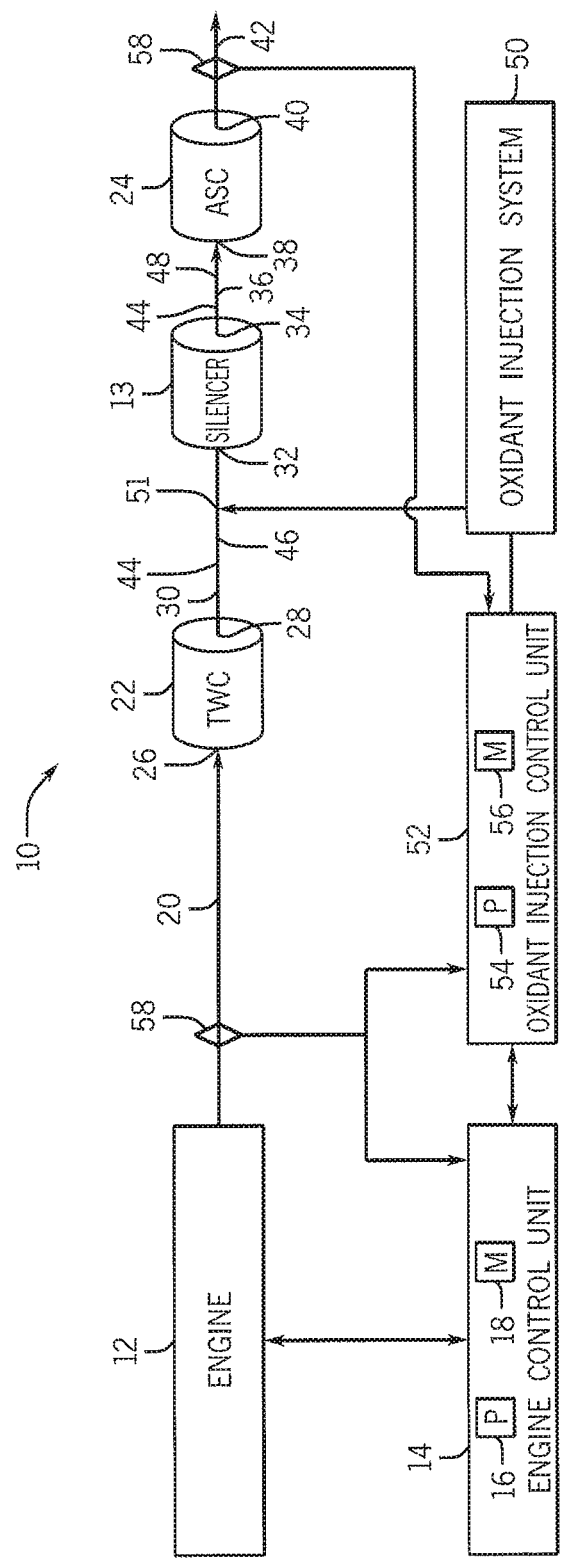
FIG. 1 is a schematic diagram of an embodiment of an aftertreatment (e.g., exhaust treatment) system coupled to an engine having a silencer (e.g., with oxidant injection upstream of the silencer)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for mixing an oxidant (e.g., air, $O_2$, oxygen-enriched air, or oxygen-reduced air) and a fluid (e.g., engine exhaust or treated engine exhaust) with a silencer (e.g., muffler). In particular, embodiments of the present disclosures include an aftertreatment system configured to couple to a combustion engine (e.g., reciprocating internal combustion engine or gas turbine engine) and to treat emissions (e.g., in the engine exhaust) from the internal combustion engine (e.g., $NO_R$, HC, CO, etc.). The disclosed embodiments may include a silencer disposed between a first catalyst assembly (e.g., three-way catalyst (TWC) assembly) and an ASC assembly that receives a fluid (e.g., treated exhaust flow) from the first catalyst assembly and converts $NH_3$ into molecular nitrogen ($N_2$) and converts CO into carbon dioxide ($CO_2$) and water. A fluid conduit is disposed between the first catalyst assembly and the ASC assembly and transfers (e.g., enables flow) of the fluid from the first catalyst assembly to the ASC assembly. A silencer (e.g., muffler) is disposed along or coupled to the fluid conduit between the first catalyst assembly and the ASC assembly. In certain embodiments, an oxidant injection system (e.g., mid-bed oxidant injection system) is coupled to the fluid conduit and injects an oxidant (e.g., air, $O_2$, oxygen-enriched air, or oxygen-reduced air) into the fluid conduit to regulate a temperature of the fluid flowing into an inlet of the ASC assembly to regulate catalytic activity in the ASC assembly that converts $NH_3$ into $N_2$. In other embodiments, the oxidant injection system is coupled to the silencer and injects an oxidant into the silencer. Turbulence within the silencer enables mixing of the oxidant and the fluid within the silencer prior to the fluid mixed with the oxidant flowing into the inlet of the ASC assembly. In certain embodiments, the silencer may solely mix the oxidant and the fluid. In other embodiments, the silencer may be responsible for a substantial portion (e.g., approximately 80 to 100 percent) of the mixing of the oxidant and the fluid. Disposition of the silencer between the first catalyst assembly and the ASC assembly (besides promoting mixing the oxidant and the fluid to enhance downstream catalytic reactions) reduces the footprint of the aftertreatment system (e.g., reduces the space occupied) and the number of components in the aftertreatment system (e.g., obviates need for separate mixing section if silencer was downstream of the ASC assembly). By reducing the footprint of the aftertreatment system, the engine and the aftertreatment system may be compatible for uses with a greater number of engine sites.

Turning now to the drawings and referring to FIG. 1, a schematic diagram of an aftertreatment system 10 coupled to an engine 12 is illustrated. As described in detail below, the disclosed aftertreatment system 10 includes a silencer 13 disposed upstream of an ASC assembly 24. The engine 12 may include an internal combustion engine such as a reciprocating engine (e.g., multi-stroke engine such as two-stroke engine, four-stroke engine, six-stroke engine, etc.) or a gas turbine engine. The engine 12 may operate on a variety fuels (e.g., natural gas, diesel, syngas, gasoline, etc.). The engine 12 may operate as a lean-burn engine or a rich-burn engine. The engine 12 may be coupled to an engine control unit (e.g., controller) 14 that controls and monitors the operations of the engine 12. The engine control unit 14 includes processing circuitry (e.g., processor 16) and memory circuitry (e.g., memory 18). The processor 16 may execute instructions to carry out the operation of the engine 12. These instructions may be encoded in programs or code stored in a tangible non-transitory computer-readable medium (e.g., an optical disc, solid state device, chip, firmware) such as the memory 18.

During operation, the engine 12 generates combustion gases 20 used to apply a driving force to a component of the engine 12 (e.g., one or more pistons or turbines). The combustion gases 20 subsequently exit the engine 12 as an exhaust 20, which includes a variety of emissions (e.g., $NO_X$, HC, CO, etc.). The aftertreatment system 10 treats these emissions to generate milder emissions (carbon dioxide ($CO_2$), water, etc.). As depicted, the aftertreatment system 10 includes catalytic converters such as the TWC assembly 22 (e.g., first catalyst assembly) and the ASC assembly 24. In embodiments that include the TWC assembly 22 and the ASC assembly 24, the engine 12 may be operated as a rich-burn engine to maximize the catalytic activity in both the TWC assembly 22 and the ASC assembly 24. The TWC assembly 22, via its catalytic activity, reduces $NO_X$ via multiple reactions. For example, $NO_X$ may be reduced via CO to generate $N_2$ and $CO_2$, $NO_X$ may be reduced via $H_2$ to generate $NH_3$ and water, and $NO_X$ may be reduced via a hydrocarbon (e.g., $C_3H_6$) to generate $N_2$, $CO_2$, and water. The TWC 22 assembly also oxidizes CO to $CO_2$, and oxidizes unburnt HC to $CO_2$ and water. A by-product of the reduction of $NO_X$ in the TWC assembly can be the emission of $NH_3$. In certain embodiments, instead of the TWC assembly 22, any catalytic converter that reduces $NO_X$ may be utilized. The ASC assembly 24, via its catalytic activity, reduces the $NH_3$ to $N_2$. In certain embodiments, the ASC assembly 24 also oxidizes CO to $CO_2$. In certain embodiments, instead of a TWC assembly 22, a SCR assembly may be utilized upstream of the silencer 13.

As depicted, the silencer 13 (e.g., muffler) is depicted between the TWC assembly 22 and the ASC assembly 24. The silencer 13 may be any type of silencer or muffler (e.g., vector muffler, spiral baffle muffler, etc.). Besides reducing the noise from exhaust, the silencer 13 is configured to receive a fluid (e.g., treated exhaust) from the TWC assembly 22 (or another catalytic converter) and an injected oxidant (e.g., air, $O_2$, oxygen-enriched air, or oxygen-reduced air) and to utilize the turbulence within the silencer 13 to mix the treated exhaust and the injected oxidant to enhance the downstream catalytic reactions (e.g., in the ASC assembly 24). Disposing the silencer 13 between the TWC assembly 22 and the ASC assembly 24 reduces the footprint of the aftertreatment system 10 (e.g., reduces the space occupied) and the number of components in the aftertreatment system 10 (e.g., obviates need for separate mixing section if silencer was downstream of the ASC assembly 24). By reducing the footprint of the aftertreatment system 10, the engine 12 and the aftertreatment system 10 may be compatible for uses with a greater number of engine sites. In certain embodiments, the silencer 13 may be utilized for an entirety of the mixing of the treated exhaust received from the TWC assembly 22 and the injected oxidant. In other embodiments, the silencer 13 may be responsible for a substantial portion (e.g., approximately 80 to 100 percent) of the mixing of the treated exhaust received from the TWC assembly 22 and the injected oxidant. For example, the silencer 13 may be responsible for mixing approximately 80, 85, 90, 95, or 100 percent of the treated exhaust and the injected oxidant. In certain embodiments, a portion of the treated exhaust and the injected oxidant may be mixed upstream of the silencer 13 due to the injection of the oxidant into the flow of the treated exhaust. No additional device is utilized to mix (e.g., actively mix) the treated exhaust received from the TWC assembly 22 and the injected oxidant upstream of the silencer 13.

The TWC assembly 22 includes an inlet 26 to receive the exhaust 20 from the engine 12 and an outlet 28 to discharge a fluid 30 (e.g., treated engine exhaust). The silencer 13 includes an inlet 32 to receive the fluid 30 (e.g., treated engine exhaust) from the TWC assembly 22 and injected oxidant (e.g., air, $O_2$, oxygen-enriched air, or oxygen-reduced air) and an outlet 34 to discharge the mixed fluid 36 (i.e., mixture of treated fluid 30 from TWC assembly 22 and the injected oxidant). In certain embodiments, the silencer 13 may include more than one inlet 32 (e.g., separate inlets for the fluid 30 and the injected oxidant). The ASC assembly 24 includes an inlet 38 to receive the fluid 36 (e.g., including the mixture of treated engine exhaust and/or injected oxidant (e.g., air, $O_2$, oxygen-enriched air, or oxygen-reduced air)) and an outlet 40 to discharge an additionally treated fluid 42. A fluid conduit 44 is disposed between the TWC assembly 22 and the ASC assembly 24. A first portion 46 of the fluid conduit 44 is disposed between and coupled to the TWC assembly 22 and the silencer 13 to enable fluid communication between them. A second portion 48 of the fluid conduit 44 is disposed between and coupled to the silencer 13 and the ASC assembly 24 to enable fluid communication between them. The fluid conduit 44 enables the flow or transfer of the fluid 30, 36 from the TWC assembly 22 to the ASC assembly 24. In certain embodiments, the TWC assembly 22, the silencer 13, and the ASC assembly 24 may be integrated within a single housing (e.g., with or without the fluid conduit 44). In embodiments, without the fluid conduit 44, oxidant may be injected directly into the silencer 13.

As depicted, an oxidant injection system 50 (e.g., mid-bed air injection system) is coupled to the fluid conduit 44. As depicted, the oxidant injection system 50 injects oxidant (e.g., air, $O_2$, oxygen-enriched air, or oxygen-reduced air) into the fluid 30 within the fluid conduit 44 (e.g., within portion 46) at a point or location 51 downstream of the outlet 28 of the TWC assembly 22 and upstream of the inlet 38 of the ASC assembly 24. In certain embodiments, the oxidant may be directly injected into the fluid 30 within the fluid conduit 44, which may result in some mixing (e.g., between 0 and less than 20 percent) of the fluid 30 and the oxidant. In other embodiments, the fluid conduit 44 may include separate conduits for both the fluid 30 and the oxidant that are coupled to the silencer 13. In certain embodiments, oxidant injection via the oxidant injection system 50 may be actively driven via a pump or injector. In other embodiments, the oxidant injection system 50 may occur via passive entrainment. In certain embodiments, instead of the oxidant injection system 50, oxidant may be provided from an air separation unit and/or via compressor bleed air from a turbine compressor.

In certain embodiments, an oxidant injection control unit 52 (e.g., processor-based controller) controls an amount of oxidant (e.g., $O_2$) injected by the oxidant injection system 50 to provide sufficient oxygen in the fluid 30, 36 prior to flowing into the inlet 38 of the ASC assembly 24 to enable the catalytic activity of the ASC assembly 24. The oxidant injection control unit 52 includes processing circuitry (e.g., processor 54) and memory circuitry (e.g., memory 56). The processor 54 may execute instructions to monitor system parameters (temperature, emissions levels (e.g., $NO_X$), etc.) and control the amount of oxidant within the fluid 30, 36 prior to entering the inlet 38 of the ASC assembly 24. These instructions may be encoded in programs or code stored in a tangible non-transitory computer-readable medium (e.g., an optical disc, solid state device, chip, firmware) such as the memory 56. In certain embodiments, oxidant injection may occur in a passive manner without active control (e.g., via control unit 52). In certain embodiments, the aftertreatment system 10 may include a plurality of transducers or sensors 58 disposed throughout the system 10 (e.g., downstream of the engine 12, upstream and/or downstream of the TWC assembly 22, upstream or downstream of the silencer 13, and/or upstream and/or downstream of the ASC assembly 24) to measure systems parameters (e.g., temperature, emissions concentration (e.g., $NO_X$), etc.) and to provide feedback (e.g., via signals representative of the system parameter) to the oxidant injection control unit 52. The sensors 58 provide feedback to the oxidant injection control unit 52 to enable control of the amount of oxidant provided to the fluid 30, 36 prior to entering the inlet 38 of the ASC assembly 24 to control the reaction in the ASC assembly. As depicted, the oxidant injection control unit 52 may be coupled to the engine control unit 14. In certain embodiments, the oxidant injection control unit 52 and the engine control unit 14 may form a single control unit.

Figure 2:
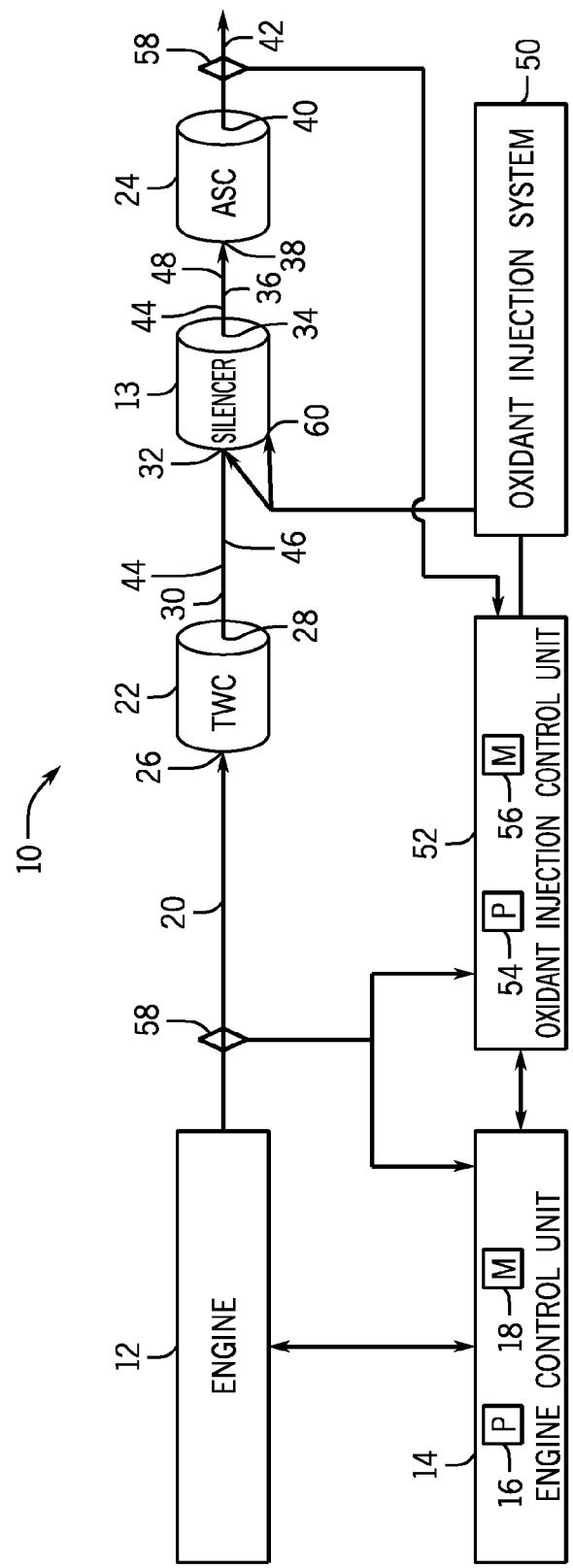
FIG. 2 is a schematic diagram of an embodiment of an aftertreatment (e.g., exhaust treatment) system coupled to an engine having a silencer (e.g., with oxidant injection at the silencer)

FIG. 2 is a schematic diagram of another embodiment of the aftertreatment (e.g., exhaust treatment) system 10 coupled to the engine 12 having the silencer 13. The engine 12 and the aftertreatment are generally as described in FIG. 1 except the injection of the oxidant is into the silencer 13 instead of the fluid conduit 44. For example, the fluid 30 (e.g., treated exhaust) may flow into silencer 13 via the inlet 32, while the oxidant may be separately injected into the inlet 32 or another inlet 60 of the silencer 13. Since the oxidant is injected directly into the silencer 13, the silencer 13 is entirely responsible for the mixing the fluid 30 and the oxidant.

Figure 3:
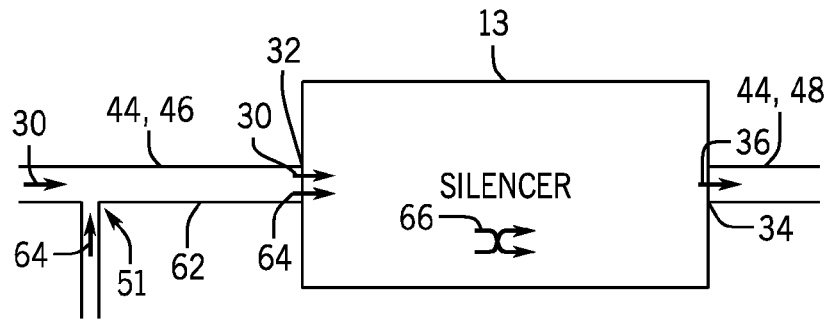
FIG. 3 is a schematic diagram of a fluid conduit (e.g., a single conduit) coupled to a silencer.

FIG. 3 is a schematic diagram of the fluid conduit 44 (e.g., having a single conduit) coupled to the silencer 13. As depicted in FIG. 3, the fluid conduit 44 has a single conduit 62 for both the fluid 30 (e.g., treated exhaust from the TWC assembly 22) and injected oxidant 64. Oxidant is injected into the fluid conduit 44 (e.g., conduit 62) at the point 51 upstream of the silencer 13. The oxidant 64 and the fluid 30 flow into silencer 13 via inlet 32. The silencer 13 (e.g., due to turbulence within the silencer 13) is responsible for a substantial portion of the mixing (e.g., between approximately 80 to 100 percent) between the oxidant 64 and the fluid 30 as indicated by reference numeral 66 to generate the mixed fluid 36. In certain embodiments, baffles within the silencer 13 may actively help with the mixing of the oxidant 64 and the fluid 30. Due to the injection of the oxidant 64, some mixing may occur between the oxidant 64 and the fluid 30 prior to reaching the silencer 13. For example, approximately 0 to less than 20 percent of the mixing of the oxidant 64 and the fluid 30 may occur in conduit 62. The mixed fluid 36 exits the silencer 13 into the fluid conduit 44 via the outlet 34. No additional device is utilized to mix (e.g., actively mix) the treated exhaust received from the TWC assembly 22 and the injected oxidant upstream of the silencer 13.

Figure 4:
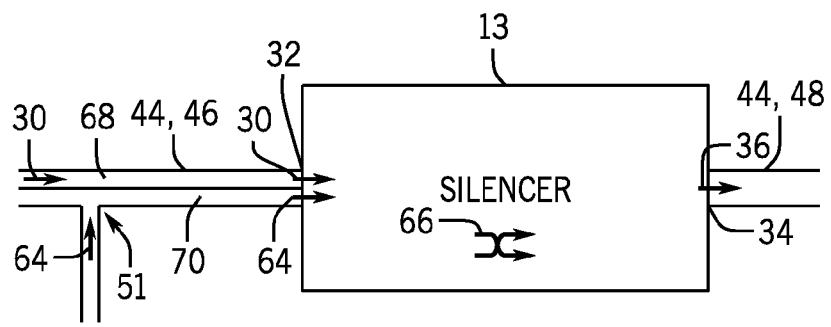
FIG. 4 is a schematic diagram of a fluid conduit (e.g., two conduits) coupled to a silencer.

FIG. 4 is a schematic diagram of the fluid conduit 44 (e.g., having two conduits) coupled to the silencer 13. As depicted in FIG. 4, the fluid conduit 44 has a conduit 68 for the fluid 30 (e.g., treated exhaust from the TWC assembly 22) and a conduit 70 for the injected oxidant 64. Although the conduits 68, 70 are depicted side by side, the conduits 68, 70 may be arranged in a concentric arrangement with one of the conduits disposed within the other conduit. Oxidant is injected into the fluid conduit 44 (e.g., conduit 70) at the point 51 upstream of the silencer 13. The fluid 30 and the oxidant 64 flow through their respective conduits 68, 70 into silencer 13 via inlet 32. The silencer 13 (e.g., due to turbulence within the silencer 13) is responsible for all of the mixing between the oxidant 64 and the fluid 30 as indicated by reference numeral 66 to generate the mixed fluid 36. The mixed fluid 36 exits the silencer 13 into the fluid conduit 44 via the outlet 34. No additional device is utilized to mix (e.g., actively mix) the treated exhaust received from the TWC assembly 22 and the injected oxidant upstream of the silencer 13.

Figure 5:
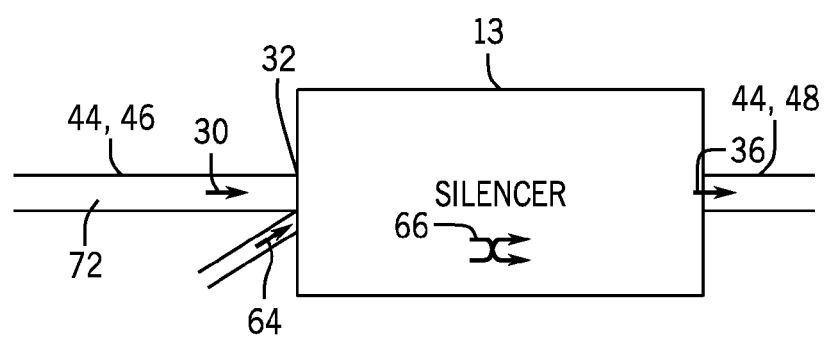
FIG. 5 is a schematic diagram of a fluid conduit coupled to a silencer.

FIG. 5 is a schematic diagram of the fluid conduit 44 coupled to the silencer 13. As depicted in FIG. 5, the fluid conduit 44 has a single conduit 72 for the fluid 30 (e.g., treated exhaust from the TWC assembly 22). The fluid 30 flows through conduit 72 into silencer 13 via inlet 32. Oxidant is injected directly into the silencer 13 at inlet 32 or another inlet. The silencer 13 (e.g., due to turbulence within the silencer 13) is responsible for all of the mixing between the oxidant 64 and the fluid 30 as indicated by reference numeral 66 to generate the mixed fluid 36. The mixed fluid 36 exits the silencer 13 into the fluid conduit 44 via the outlet 34. No additional device is utilized to mix (e.g., actively mix) the treated exhaust received from the TWC assembly 22 and the injected oxidant upstream of the silencer 13.

Technical effects of the disclosed embodiments include systems and methods for mixing oxidant 64 (e.g., air, $O_2$, oxygen-enriched air, or oxygen-reduced air) and fluid 30 (e.g., engine exhaust or treated engine exhaust) with the silencer 13 (e.g., muffler). In particular, embodiments of the present disclosures include an aftertreatment system 10 that includes the silencer 13 disposed downstream of a catalyst assembly (e.g., TWC assembly 22) and upstream of the ASC assembly 24. The silencer 13 is responsible for all or at least a substantial portion of the mixing of the fluid 30 and the oxidant 64 upstream of the ASC assembly 24 via the turbulence within the silencer 13. Disposition of the silencer 13 between the catalyst assembly and the ASC assembly 24 (besides promoting mixing the oxidant 64 and the fluid 30 to enhance downstream catalytic reactions) reduces the footprint of the aftertreatment system 10 (e.g., reduces the space occupied) and the number of components in the aftertreatment system 10 (e.g., obviates need for separate mixing section if silencer 13 was downstream of the ASC assembly 24). By reducing the footprint of the aftertreatment system 10, the engine 12 and the aftertreatment system may be compatible for uses with a greater number of engine sites.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an exhaust aftertreatment system configured to treat emissions from a combustion engine, wherein the exhaust aftertreatment system comprises:
a first catalyst assembly having an outlet;
an ammonia slip catalyst (ASC) assembly configured to receive a fluid from the first catalyst assembly and to convert ammonia ($NH_3$) within the fluid into nitrogen ($N_2$), wherein the ASC assembly has an inlet;
a fluid conduit disposed between the first catalyst assembly and the ASC assembly and configured to transfer the fluid from the first catalyst assembly to the ASC assembly;
an oxidant injection system configured to provide an oxidant for mixing with the fluid to provide sufficient oxygen in the fluid flowing into the inlet of the ASC assembly to enable the catalytic activity in the ASC assembly that converts $NH_3$ into $N_2$; and
a silencer disposed along the fluid conduit between the outlet of the first catalyst assembly and the inlet of the ASC assembly, wherein the silencer is configured to receive and to mix both the fluid and the oxidant.

2. The system of claim 1, wherein only the silencer is configured to mix the fluid and the oxidant in the exhaust aftertreatment system.

3. The system of claim 1, wherein the silencer is configured to mix a substantial portion of the fluid and the oxidant.

4. The system of claim 1, wherein the fluid comprises treated exhaust gases of the combustion engine.

5. The system of claim 1, wherein the first catalyst assembly comprises a three-way catalyst assembly.

6. The system of claim 1, comprising the combustion engine coupled to the exhaust aftertreatment system.

7. The system of claim 1, wherein the oxidant injection system is coupled to the fluid conduit and configured to inject the oxidant into the fluid conduit upstream of the silencer.

8. The system of claim 7, wherein the fluid conduit comprises a first conduit configured to flow the fluid and a second conduit configured to flow the oxidant, and the first and second conduits are coupled to a silencer inlet of the silencer.

9. The system of claim 7, wherein the fluid conduit comprises a single conduit configured to flow the fluid and the oxidant at and downstream of a point of injection of the oxidant along the fluid conduit, and the single conduit is coupled to a silencer inlet of the silencer.

10. The system of claim 1, wherein the oxidant injection system is coupled to the silencer and is configured to inject the oxidant into the silencer.

11. A system, comprising:
an exhaust aftertreatment system configured to treat emissions from a combustion engine, wherein the exhaust aftertreatment system comprises:
a first catalyst assembly having an outlet;
an ammonia slip catalyst (ASC) assembly configured to receive a fluid from the first catalyst assembly and to convert ammonia ($NH_3$) within the fluid into nitrogen ($N_2$), wherein the ASC assembly has an inlet; and
a silencer disposed between the outlet of the first catalyst assembly and the inlet of the ASC assembly, wherein the silencer is configured to receive the fluid and an oxidant for mixing with the fluid to provide sufficient oxygen in the fluid flowing into the inlet of the ASC assembly to enable the catalytic activity in the ASC assembly that converts $NH_3$ into $N_2$, and the silencer is configured to mix the fluid and the oxidant.

12. The system of claim 11, wherein only the silencer is configured to mix the fluid and the oxidant in the exhaust aftertreatment system.

13. The system of claim 11, wherein the fluid comprises treated exhaust gases of the combustion engine.

14. The system of claim 11, wherein the first catalyst assembly comprises a three-way catalyst.

15. The system of claim 11, comprising the combustion engine coupled to the exhaust aftertreatment system.

16. The system of claim 11, comprising a fluid conduit disposed between the first catalyst assembly and the ASC assembly and configured to transfer the fluid from the first catalyst assembly to the ASC assembly, wherein the silencer is disposed along the fluid conduit between the outlet of the first catalyst assembly and the inlet of the ASC assembly.

17. The system of claim 16, wherein the conduit is configured to receive the oxidant at a point downstream of the first catalyst assembly and upstream of the silencer.

18. A method for promoting catalytic activity within an ammonia slip catalyst (ASC) assembly in an exhaust aftertreatment system to treat emissions from a combustion engine, comprising:
flowing fluid from an outlet of a first catalyst assembly to an inlet of the ASC assembly;
injecting an oxidant into the fluid to provide sufficient oxygen in the fluid flowing into the inlet of the ASC assembly; and mixing the fluid and oxidant within a silencer disposed between the first catalyst assembly and the ASC assembly.

19. The method of claim 18, comprising injecting the oxidant downstream of the first catalyst assembly and upstream of the silencer.

20. The method of claim 18, comprising injecting the oxidant within the silencer.

* * * * *